United States Patent
Karlsson et al.

(10) Patent No.: US 7,138,885 B2
(45) Date of Patent: Nov. 21, 2006

(54) TRANSMIT RECEIVE SWITCH WITH HIGH POWER PROTECTION

(75) Inventors: Peter Karlsson, V. Frolunda (SE); Thomas Ove Emanuelsson, V Frolunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/508,466

(22) PCT Filed: Mar. 22, 2002

(86) PCT No.: PCT/SE02/00573

§ 371 (c)(1),
(2), (4) Date: Sep. 21, 2004

(87) PCT Pub. No.: WO03/081275

PCT Pub. Date: Oct. 2, 2003

(65) Prior Publication Data

US 2005/0146392 A1    Jul. 7, 2005

(51) Int. Cl.
*H01P 1/10* (2006.01)
*H04B 1/44* (2006.01)

(52) U.S. Cl. ......................................... 333/103; 455/78

(58) Field of Classification Search ................ 333/103, 333/110; 455/78, 83
See application file for complete search history.

(56) References Cited

U.S. PATENT DOCUMENTS 4,979,232 A * 12/1990 Martz et al. .................. 455/78
5,911,116 A * 6/1999 Nosswitz ..................... 455/83
6,195,535 B1 * 2/2001 Kurchuk ...................... 455/83

FOREIGN PATENT DOCUMENTS

| EP | 0446050 A2 | 9/1991 |
| EP | 0690576 A2 | 1/1996 |
| GB | 1201320 A | 8/1970 |
| JP | 07 074672 A | 3/1995 |

OTHER PUBLICATIONS

Swedish Patent Office, International Search Report for PCT/SE02/00573, dated Oct. 8, 2002.
Derwent's abstract, No 98-119314/11, week 9811, Abstract of Ru, 2084992, (Vasilegin B V), Jul. 20, 1997.
Database WPI, Week 199520, Derwent's Publication Ltd., London, GB, Class U21, AN 1995-150805.
IEE Colloquim on "Electronically Scanned Antennas", (Digest No. 13), Jan. 1998, K. Wilson et al: "An MMIC Pin Diode T/R Switch", figure 1, pp. 1-4.

* cited by examiner

*Primary Examiner*—Dean Takaoka
(74) *Attorney, Agent, or Firm*—Roger S. Burleigh

(57) ABSTRACT

Microwave switch (MS) comprising an antenna branch (AB), a receive branch (RB), and a transmit branch (TB). According to one embodiment, the switch comprises a protection circuit (CPL, DTC, CTRL), which upon a high power signal (Dtc_h) being present on the antenna branch effectuates a biasing of semiconductors on both the receive branch (RB) and the transmit branch (TB). According to one embodiment PIN diodes are provided for controlling switching between the transmit and the receiv branch as well as enabling a protective mode, the control being accomplished by selectively biasing respective diodes.

8 Claims, 3 Drawing Sheets

US 7,138,885 B2

TRANSMIT RECEIVE SWITCH WITH HIGH POWER PROTECTION

FIELD OF THE INVENTION

The present invention relates to a switch arrangement for a microwave transmit and receive system. More particularly the invention relates to a switch and protection arrangement for a transmit and receive system and in particular a radar system.

BACKGROUND OF THE INVENTION

In typical synthetic aperture radar systems a plurality of antenna elements are provided, through which both high power signals are emitted and corresponding low power echoes are received. So-called transmit receive (T/R) modules have the function of switching between incoming and outgoing signals and to provide input and output phase adjustment as well as input amplification.

It is widely known to use ferrite circulators in order to separate incoming and outgoing signals. However, circulators are only effective up to certain magnitudes of power.

Another drawback with ferrite circulators is their bulk and weight.

It is known to use passive limiters for protecting the input section of a radar system.

Prior art document EP-A-0391326 discloses a receiving transmission line comprising an antenna input post, over which signals are transmitted to a receiver. The transmission line comprises two PIN diodes. The PIN diodes are adapted to be selectively biased for reflecting signals entering the transmission line and thereby protecting the input stage and adapted for being selectively unbiased for rendering the parallel-coupled PIN diodes yielding a high impedance and thereby opening the transmission line for signals to be received. Protection is accomplished also when the equipment is switched off.

Prior art document U.S. Pat. No. 4,232,278 shows a radar receiver protector circuit having a transmission line input stage comprising first, second and third parallel coupled PIN diodes. The circuit discloses sensitivity time control, functioning as a passive limiter during transmit and controlled attenuator during receive.

Prior art document U.S. Pat. No. 4,789,846 shows a microwave semiconductor switch, for instance for switching an antenna between transmission and reception modes wherein first and second field effect transistors and first, second and third input/output microstrip lines are integrally formed on a semiconductor substrate. The first field effect transistor is connected in series between the second input/output line and a junction point of the first second and third input/output lines at a position spaced approximately a quarter of the wavelength from the junction point. The second field effect transistor is connected at a second position spaced approximately a quarter of the wavelength from the junction point between the second position and the ground. The transmission paths for microwaves are switched by varying a bias voltage applied to the gate electrodes of the field effect transistors. The switch offers no protection against incoming high-energy signals.

SUMMARY OF THE INVENTION

The invention seeks to accomplish a microwave switch for switching between incoming signals from an antenna and outgoing signals to the antenna, while offering high power protection and being adapted for single chip Microwave Monolithic Integrated Circuit (MMIC) design.

It is moreover an object to accomplish a switch with protection for incoming signals which functions disregarding the state of the switch.

It is another object to set forth a transmit and receive module, which can withstand enhanced high power signals.

It is a further object to accomplish still further enhanced protection against incoming signals.

It is a further object to accomplish a microwave switch that performs rapid passive protection and effective long term protection.

Further advantages will appear from the remaining claims and the following detailed description of the invention.

DETAILED DESCRIPTION OF PREFERRED EMBODIMENTS OF THE INVENTION

Figure 1:
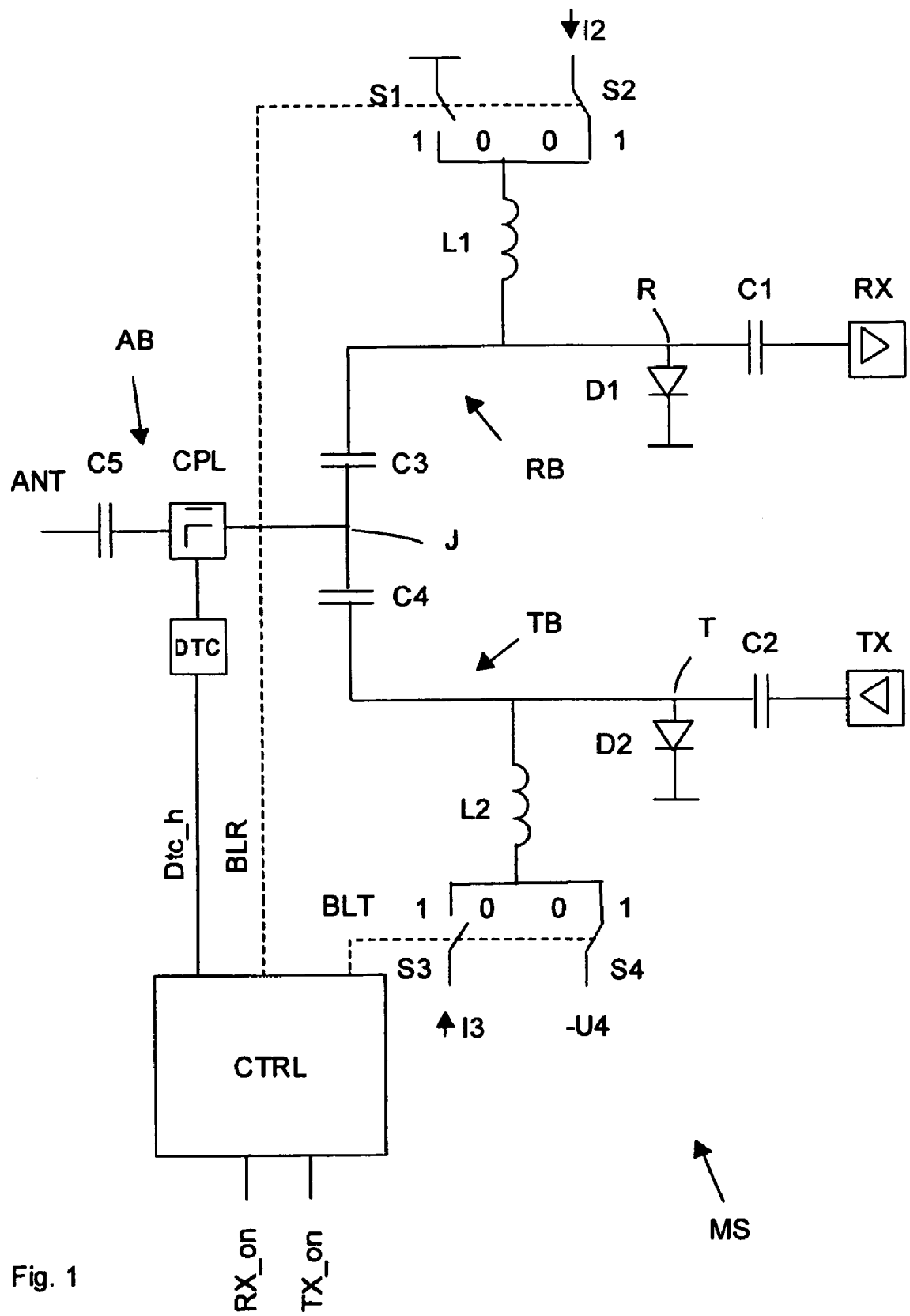
FIG. 1 shows a first preferred embodiment of the invention.

In FIG. 1, a first embodiment of the microwave switch apparatus according to the invention has been shown.

The microwave switching apparatus MS comprises an antenna terminal ANT, which is adapted to be coupled to an external antenna (not shown). The microwave switching apparatus is also adapted to be coupled to a radar system (not shown), which controls the switching apparatus. The antenna terminal is being coupled over an optional capacitor C5 to an antenna branch AB, which is connected to a first junction J. The antenna branch may advantageously comprise a coupler CPL. The first junction J couples to a receive branch RB and a transmit branch TB.

The first junction J connects to first receive branch capacitor C3, which couples to a receive branch RB comprising a receive junction R. The receive branch RB couples to a second receive branch capacitor C1 coupling to a receive amplifier RX. The receive junction R is preferably arranged at a distance corresponding to a quarter wavelength of a predetermined wavelength from the first junction J. At the receive junction R, a first diode D1 branches off to ground.

The first junction J connects also to first transmit branch capacitor C4, which couples to a transmit branch TB comprising a transmit junction T. The transmit branch TB couples to a second transmit branch capacitor C2 coupling to a transmit amplifier TX. The transmit junction T is preferably arranged at a distance corresponding to a quarter wavelength of a predetermined wavelength from the first junction J. At the transmit junction T, a second diode D2 branches off to ground.

The first and second diodes D1, D2 are controlled by a control circuit CTRL, which controls appropriate DC bias levels over the respective first and second diode over respective logic bias lines BL over switches S1–S4. The control circuit CTRL has a receive mode input and a transmit mode input from which logic control signals RX_on, TX_on is input from the radar system control logic (not shown). Moreover, the control circuit CTRL is connected to a detector circuit DTC, which again is connected to coupler CPL.

If a high power signal is coming in on the antenna branch AB, the signal is transmitted over the coupler and is detected by detector DTC, which outputs a DC voltage signal DTC_h to control circuit CTRL.

The purpose of the coupler CPL is to pick up a small amount of the incoming signal, typically −20 dB (1%) with minimum insertion loss. Preferably, the coupler is directional, whereby only incoming signals, not outgoing signals from the transmitter, are picked up.

The detector DTC converts the RF-signal from coupler CPL to DC voltage signal Dtc_h. Advantageously; the detector element is a high frequency Schottky diode.

The control circuit CTRL is designed to deliver bias currents (a few mA) or a reverse voltage to the diodes D1 and D2 depending on the control signals RX_on, TX_on and the DC voltage signal from DTC.

Advantageously, the first and second diodes are PIN diodes that are able to withstand high power transients and therefore are suitable in high-power circuits.

Advantageously, the transmitter, receiver and the antenna are terminated into 50 ohms.

For the receive branch there is provided a first switch S1 for coupling the ground and a second switch S2 for coupling a current source I2 over inductor L1 to receive junction R.

For the transmit branch there is provided a third switch S3 for coupling a current source I3 and a fourth switch S4 for coupling to voltage −U4 over inductor L2 to transmit junction T.

Switches S1–S4 are controlled by control unit CTRL.

The functionality of the circuit shall now be explained with reference to table 1 below. For signals RX-on, TX-on, Dtc_h, one designates a high biasing voltage and zero designates a low or ground biasing voltage. For switches S1–S2, zero indicates an open switch while one indicates a closed switch. x indicates that either a 0 state or 1 state can be adopted. The table below illustrates the permanent states after a state transition and not the transitional conditions.

TABLE 1

| Mode | RX-on | TX-on | Dtc_h | S1/GND | S2/I2 | S3/I3 | S4/−U4 |
|---|---|---|---|---|---|---|---|
| transm | 0 | 1 | 0 | 0 | 1 | 0 | 1 |
| receive | 1 | 0 | 0 | 1 | 0 | 1 | 0 |
| incident | x | x | 1 | 0 | 1 | 1 | 0 |
| protect | 0 | 0 | x | 0 | 1 | 1 | 0 |

A forward current through the respective diode D1 or D2 renders the diode conductive causing the diode to present a low impedance value over its terminals, while a low or reverse biasing voltage 0 over the diode renders the diode non-conducting causing it to present a high impedance over its terminals.

As appears from the table above, when the radar system adapts a receive mode, a signal RX_on is present on control circuit CTRL, switch S1 connects to ground and switch S2 is open. Thereby, input signals derived from the antenna terminal (ANT) are received over the receive branch RB. A DC return path is established through switch S1 and coil L1, which allows the rectified current in D1 stemming from the incident signal to flow through the diode rendering the diode self biased if exposed to incident high power.

In receive mode, switches S3 and S4 are operated so as to feed a current I3 through coil L2 into transmit branch T and through diode D2, forcing diode D2 into a low impedance state. Thereby, transmit branch TB is grounded at point T, whereby signals entering the transmit branch are reflected by the shortcut. The impedance seen at junction J into the transmit branch is very high, since the distance between junctions J and T corresponds approximately to a quarter wavelength of the intended signal.

In transmit mode switches S1 and S2 are operated so as to drive a current I2 through coil L1 into branch RB and through diode D1, whereby the forward biasing current forces diode D1 into a low impedance state. Signals which enter the receive branch RB are thereby reflected by the shortcut. The distance between junctions J and R corresponding to a quarter wavelength of the intended signal renders the impedance seen from the junction J towards the receive branch RB very high. Thereby, the transmit signal can pass without attenuation and the receive branch is protected.

To avoid interference between transmission and power protection, it is suitable to back-bias diode D2 in the transmit branch during transmission. Therefore, switches S3 and S4 are operated to feed a negative voltage U4 over coil L2 and diode D2.

Should an incident high power microwave signal be received on the antenna branch, such microwave signal propagates via coupler CPL to detector DTC. A signal DTC_h is provided to the control circuit CTRL. When control circuit CTRL detects the DTC_h signal, it causes both diodes D1 and D2 to be biased, disregarding the state of the signals RX_on and TX_on, leading to the incoming high power microwave signal being reflected from the antenna terminal ANT. Thereby, the device adapts a protective mode.

A protective mode may also be actively controlled from the control circuit as indicated in the table 1 above.

Since the signalling paths from the coupler CPL and through the control circuit CTRL to the respective diodes D1 and D2 are not insignificant and since it would typically be infeasible to render the transmit branch and receive branch sufficiently long to cause appropriate delays, the control circuit CTRL can not accomplish an active switching of the diodes before the incoming high power pulse reaches the diodes.

However, according to the invention, passive protection is accomplished by the diodes D1 and D2 in an initial phase of an incoming a high-energy impulse, when in receive or transmit mode. The passive protection is due to the self-biasing effect of the diodes if subject to an incoming high power microwave signal, whereby the diodes represents a zero impedance, which causes the incoming wave to be reflected at the respective diode.

Figure 3:
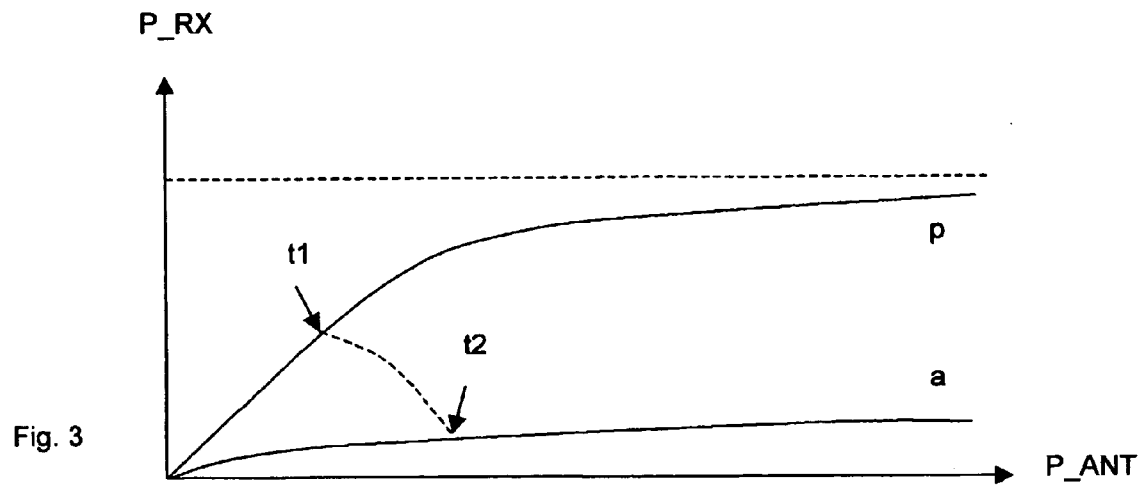
FIG. 3 shows an active and a passive characteristic of the first preferred embodiment of the invention for a receive branch.

In FIG. 3, the dampening properties of the circuit have been shown for a passive mode P and an active mode A, whereby the power at input RX is shown as a function of the incoming impulse P_ant at antenna input ANT. The characteristic P corresponds to a situation where the protection circuit-coupler CPL, detector DTC, control circuit CTRL, switches S1–S4—would not be provided. Hence, the passive mode corresponds to the situation where the respective diodes are not biased when a high-energy impulse is arriving at the antenna branch. The active characteristic corresponds to the dampening characteristic should the diode already be in a biased state when a high power pulse impinges on the antenna branch.

The passive protection also protects the receiver and the transmitter when the coupler/control circuitry is non-operational, either as an effect of a fail state or as an affect of that the system is not in use (power off).

As appears from FIG. 3, the dampening properties of the actively controlled diodes are more effective than the passive dampening due to the current which keeps the diode in a low impedance state during the full radio frequency state.

Figure 5:
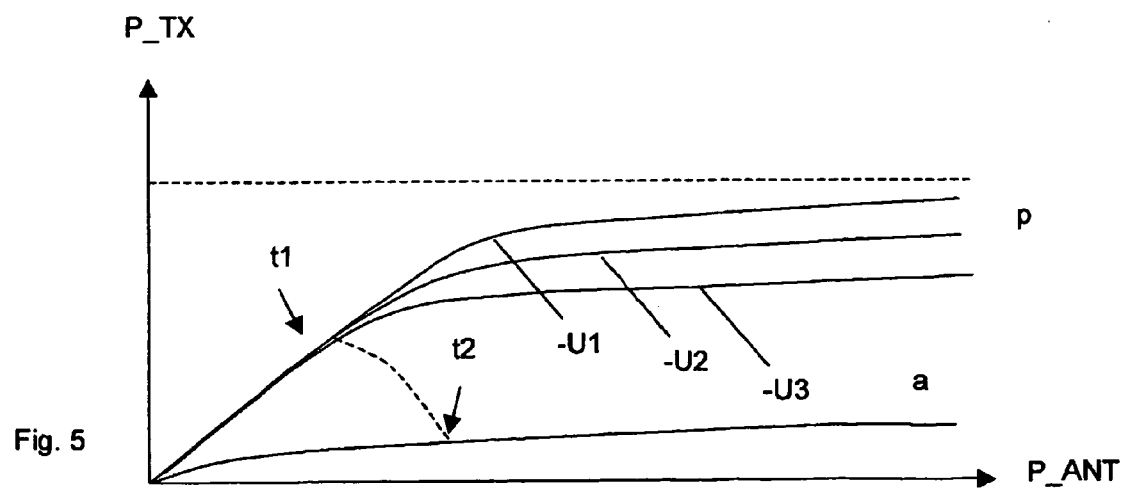
FIG. 5 shows an active and a passive characteristic of the first preferred embodiment of the invention for a transmit branch.

It should be noted that the dampening properties at input TX has a similar shape to FIG. 3. However, the active curve is controlled by the level of the reverse voltage U as illustrated in FIG. 5. The protection is typically designed so that in passive mode the limit level is slightly higher than the transmit power.

Figure 4:
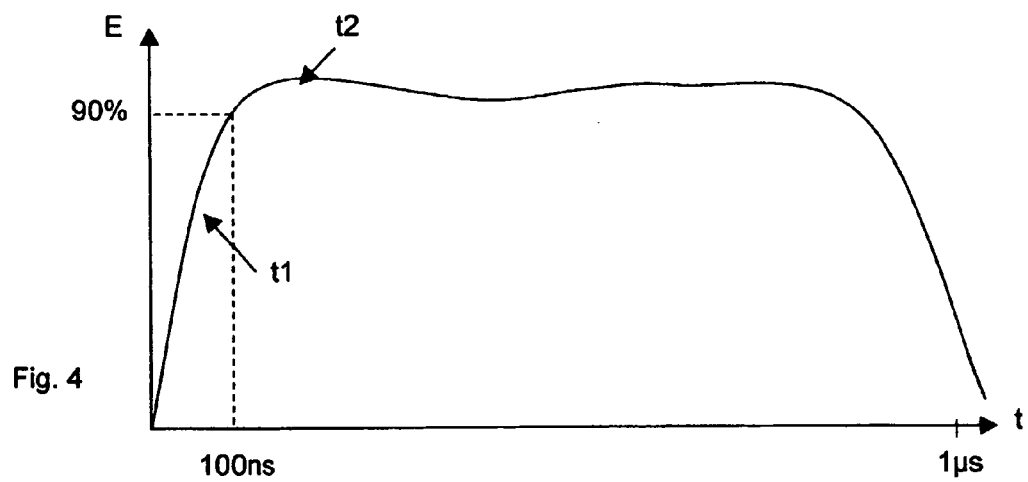
FIG. 4 shows an exemplary high power pulse.

In FIG. 4, the positive envelope of an exemplary high frequency high power pulse train has been shown. The pulse train for instance has a duration of about 1 micro second and within 100 ns 90% of the peak power is reached. Off course, the incident signal could have many other shapes. It is an object of the invention to protect against unwanted pulses, such as jamming or other inadvertent signals. In this context, a RF signal with a power level exceeding the maximum allowed input power to the receiver RX and/or the transmitter TX is considered a high power signal. Maximum input power is typically rated to about +15 dBm for many receivers.

When exposed to the above exemplary high power pulse train when in receive or in transmit mode, the switch according to the invention dampens the incoming pulse according to the passive characteristic p up until time t1, denoted in FIGS. 3 and 4. Subsequently, the control circuit effects the switching at t2, allowing for the more effective dampening according to the active characteristic a.

It is noted, that the control circuit CTRL is able to bias (switch on) the PIN diodes in time, if the sum of the delays in the detector, the control circuit and the PIN diodes is less than the rise time of the incoming high power pulse. However, if this is not the case, the energy is still limited since the exposure to high power pulses is of limited duration as appears from the transition from t1 to t2. It is noted that component failure could be caused by break down due to a peak effect or burn off due to a total energy exposure.

Thus it is possible to use the invention without the control circuit and to take advantage of the passive limitation in the diodes, but it would decrease the ability to handle the highest incident power pulses.

Figure 2:
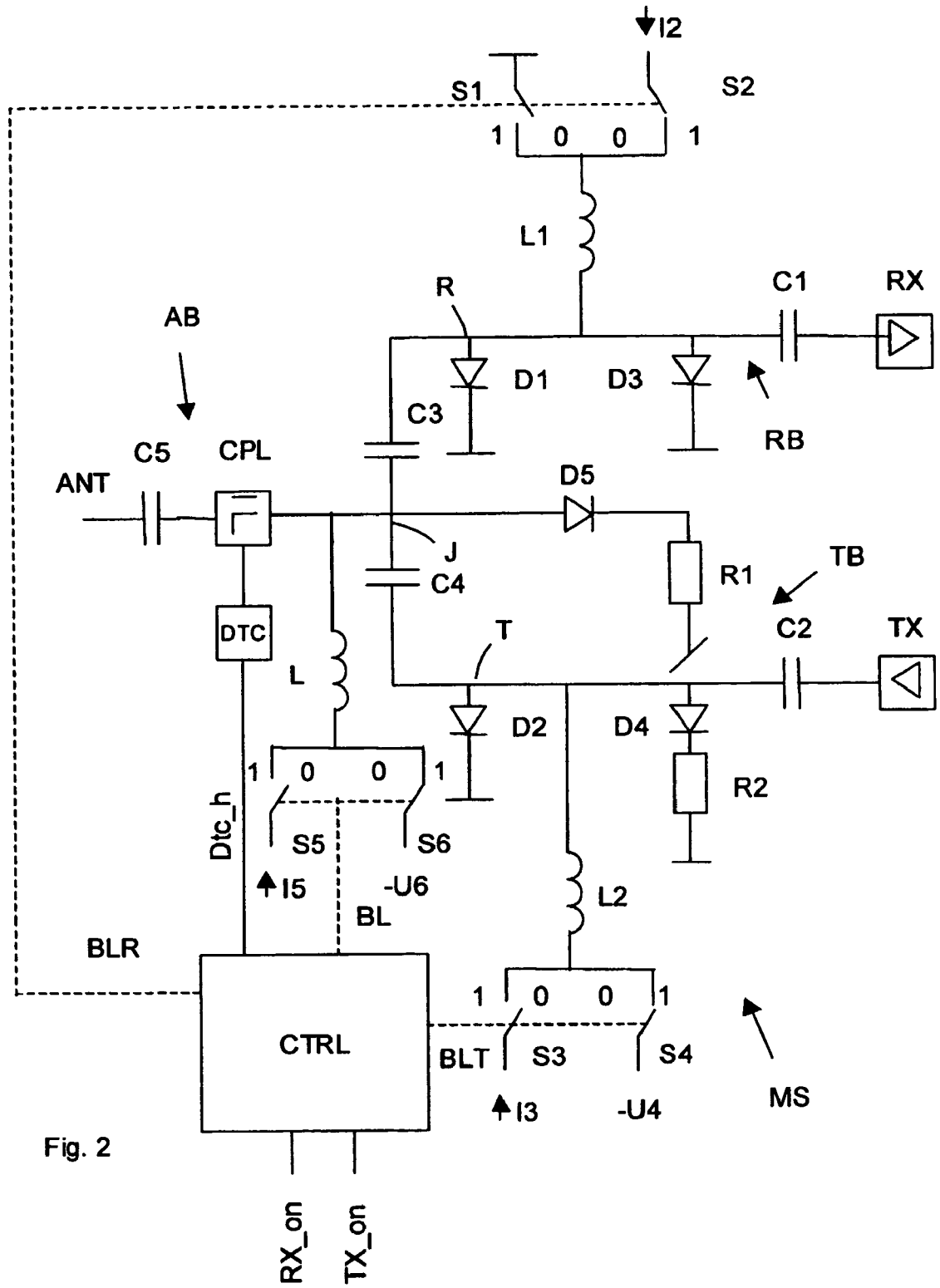
FIG. 2 shows a second preferred embodiment of the invention.

In FIG. 2, a further embodiment of the invention has been shown. As in FIG. 1, switches S1–S4, inductors L and control units CTRL are provided and these have the same functionality.

According to this embodiment, further diodes D3 and D4 have been inserted into the transmit branch and the receive branch, at points C and D, respectively. Moreover, a fifth diode D5 in series with a resistor R1 connects to the first junction J and is biased over bias line BLJ from control circuit CTRL. The above diodes D3 and D4 are arranged at a quarter wavelength from the first and second diode, respectively.

The further diode D3 in the receive branch obviates leakage power to reach the receiver.

The further diode D4 in the transmit branch is coupled to resistor R2 which presents a load to the transmitter in the protected mode.

The fifth diode D5 loads the antenna when in the protective mode. The fifth diode D5 is arranged at the junction, J and couples through resistor R1 to ground. Switches S5 and S6 selectively provide a biasing current I5 or a reverse voltage U6, to junction J.

The circuit operates in the same manner as the circuit shown in FIG. 1 when in receive or transmit mode. When a high level signal is present on the antenna branch, the fifth diode is biased, as shown in the table below, and an incoming signal is, apart from being reflected at diodes D1 and D2, absorbed in resistor R2. Residual power is moreover reflected at diodes D3 and D4.

The main improvement is to achieve higher isolation between the antenna and the receiver/transmitter, and that the transmitter and antenna are terminated during protection or high power modes.

TABLE 2

| Mode | RX-on | TX-on | Dtc_h | S1/ GND | S2/ I1 | S3/ I3 | S4/ −U4 | S5/ I5 | S6/ −U6 |
|---|---|---|---|---|---|---|---|---|---|
| trans. | 0 | 1 | 0 | 0 | 1 | 0 | 1 | 0 | 1 |
| receive | 1 | 0 | 0 | 1 | 0 | 1 | 0 | 0 | 1 |
| incident | x | x | 1 | 0 | 1 | 1 | 0 | 1 | 0 |
| protect | 0 | 0 | x | 0 | 1 | 1 | 0 | 1 | 0 |

The invention claimed is:

1. A microwave switch comprising:
   an antenna branch coupled to a first junction, the first junction coupled to a receive branch coupled to a receiver;
   the receive branch comprising a first semiconductor which can be selectively biased in order to reflect signals transmitted over the receive branch wherein the junction is coupled to a transmit branch coupled to a transmitter;
   the transmit branch comprising a second semiconductor which can be selectively biased in order to reflect signals transmitted over the transmit branch;
   a control circuit connected to the receive branch by a first bias line and connected to the transmit branch by a second bias line, the control circuit, when operating in a receive mode, biasing the semiconductor in the transmit branch, and when operating in a transmit mode biasing the semiconductor in the receive branch; and,
   a protection circuit which, upon a high power signal being present on the antenna branch, effectuates a biasing of semiconductors on both the receive branch and the transmit branch;
   wherein the first and second semiconductors are diodes, said first and second diodes being self-biased according to a first passive dampening characteristic if subject to a high power signal on said antenna branch, said protection circuit subsequently actively controlling dampening by biasing said semiconductors according to an active dampening characteristic.

2. The microwave switch according to claim 1, wherein the switch comprises a diode in series with a resistor which is coupled to the first junction and is biased by the protection circuit if a high power signal is present on the antenna branch.

3. The microwave switch according to claim 1 wherein the protection circuit comprises:
   a coupler coupling to the antenna branch; and
   a detector for generating a DC signal upon reception of a high power signal on the coupler;
   wherein the control circuit feeds a bias signal on the transmit branch or the receive branch.

4. The microwave switch according to claim 3, wherein the coupler is directional such that substantially only incoming signals are picked up.

5. The microwave switch according to claim 1, wherein the control circuit is operated in correspondence with modes of a radar system.

6. The microwave switch according to claim 1, wherein a protection mode is provided in which all diodes are biased.

7. The microwave switch according to claim 1, wherein the receive branch is coupled to respective switches operable by the control circuit for feeding a biasing current or a ground level potential over the diode or diodes in the receive branch.

8. The microwave switch according to claim 1, wherein the transmit branch is coupled to respective switches operable by the control circuit for feeding a biasing current or a reverse voltage over the diode or diodes in the transmit branch.

\* \* \* \* \*